United States Patent [19]

Whyte

[11] 3,980,954

[45] Sept. 14, 1976

[54] BIDIRECTIONAL COMMUNICATION SYSTEM FOR ELECTRICAL POWER NETWORKS

[75] Inventor: Ian A. Whyte, Churchill Borough, Pa.

[73] Assignee: Westinghouse Electric Corporation, Pittsburgh, Pa.

[22] Filed: Sept. 25, 1975

[21] Appl. No.: 616,711

[52] U.S. Cl. ............................... 325/48; 325/64; 340/310 A; 340/310 R
[51] Int. Cl.² ................................... H04M 11/02
[58] Field of Search ................. 325/36, 47, 48, 55, 325/64; 179/2 E, 2.5 B, 41 A; 340/310 R, 310 A, 311, 312

[56] References Cited
UNITED STATES PATENTS

| | | | |
|---|---|---|---|
| 3,376,506 | 4/1968 | Sontag | 325/64 |
| 3,714,375 | 1/1973 | Stover | 179/2 E |

Primary Examiner—Benedict V. Safourek
Attorney, Agent, or Firm—D. R. Lackey

[57] ABSTRACT

An arrangement of communication components to provide communications between a central control center and various customer load locations in an electrical power distribution system. Control or interrogation signals are originated at the control center and transmitted over a suitable facility, such as a telephone line, to an FM broadcast station. The control signals frequency modulate an ultrasonic subcarrier which modulates the FM broadcast transmitter simultaneously with the normal broadcast program material. Radio receivers at the customer load locations receive, filter, and decode the broadcast signals which are used to activate the control or logic circuits associated with the customer location. A reply signal is generated at the customer location and applied to the power lines by carrier techniques. The power line carrier reply signal is remotely detected by a suitable receiver and transferred over a suitable wire line facility which terminates at the control center.

8 Claims, 3 Drawing Figures

BIDIRECTIONAL COMMUNICATION SYSTEM FOR ELECTRICAL POWER NETWORKS

BACKGROUND OF THE INVENTION

1. Field of the Invention

This invention relates, in general, to communication systems and, more specifically, to systems for communicating between electrical power customer locations and a control center.

2. Description of the Prior Art

Power line communication systems are used to convey various information between different locations in an electrical power distribution system. One type of communication system of growing importance is a system which transfers information between a central control station and the customer load location. Such a system can be used to selectively control the power consumption at the customer location, interrogate the customer's metering facility to produce signals which are responsive to the energy used, or for any other purpose requiring two-way communication facilities.

Conventional two-way communication facilities are bidirectional in nature. That is, they are capable of conveying information over the same route in both directions between the customer location and the central control station. This requires communication components of considerable complexity to provide adequate two-way transmission. Therefore, it is desirable, and it is an object of this invention, to provide a communication system for electrical power systems which requires relatively simple components capable of one-way transmission.

Many conventional power line communication systems use a portion of the power line to transmit or convey the signals between two different locations in the power distribution system. A problem exists with such systems when the communication signals are used to sectionalize or control the route over which the electrical power is conveyed. During a line fault or other condition in which the power transmission line has been interrupted or severely loaded, it becomes very impractical to receive carrier communication signals impressed upon the transmission or distribution line. Consequently, at the very time when control functions are necessary, such communication systems are not effective in controlling the load applications to the power system. Therefore, it is also desirable, and it is another object of this invention, to provide a communication system for electrical power systems which provides selective load and control switching regardless of the condition of the transmission and distribution lines.

Conventional power system communication systems which are not susceptible to line faults usually involve the use of telephone lines or radio facilities to transmit information and control signals to the remote locations along the power system. The use of telephone lines provides continuity even when the transmission or distribution lines are discontinuous. However, such telephone lines are relatively uneconomical for this type of service and are still susceptible to outage due to broken lines, which may occur simultaneously with the power lines if the cause of the outage is due to the failure of a common supporting structure for both lines.

Using radio facilities overcomes the problems associated with communications to a switching location positioned, for instance, at a customer location. However, the use of such radio facilities has not proven to be extremely practical since the power output of such facilities is relatively low and a considerable number of transmitting facilities must be provided to ensure sufficient coverage. In addition, the receiving apparatus associated with such radio systems is manufactured on a relatively low volume basis and is comparatively expensive. Therefore, it is also desirable, and it is another object of this invention, to provide a communication system for electrical power systems which can still control the application of a load at a customer location when either the telephone lines or the electrical lines are damaged, which uses radio facilities having sufficient power and coverage to effectively make such use economical, and which uses conventional radio receiver technology and the economical benefit of high production assemblies to make the cost of the receiver practical.

SUMMARY OF THE INVENTION

There is disclosed herein a new and useful communication system for electrical power systems. The communication system contains a control center which originates interrogation and/or control signals which are to be transmitted to remote locations along the power system. The control center originates a two-tone binary coded signal which corresponds to the control or interrogation information which is to be transmitted. The two-tone signal is conveyed by a suitable medium or facility, such as a telephone line, to an FM broadcast station having a coverage area which includes the receiver to which the two-tone signal is being directed.

The two-tone signal frequency modulates an ultrasonic subcarrier which, along with the regular broadcast program material, frequency modulates the FM broadcast transmitter. The signals from the broadcast transmitter are received on an FM receiver located at the power customer location and, after proper decoding, are applied to appropriate control and logic circuits. These circuits are interconnected with the metering and load components at the customer location in such a manner that interrogation or control thereof is possible. In cases where the signal originated at the control center requires a reply signal from the customer location, the reply signal is applied through an appropriate coupler to the electrical lines serving the customer location. Conventional power line carrier communication techniques may be used for this segment of the communication system. At a distant location from the customer location, the reply signal is removed from the power line and applied to a suitable receiver which converts the carrier communication signal to a suitable signal for transmission back to the control center by suitable wire line facilities, such as a telephone line.

By using the arrangement taught by this invention, communication links are provided which are unidirectional in nature, therefore offering equipment simplicity over systems requiring bidirectional transmission. In addition, control of load applications at the customer locations is not susceptible to transmission or distribution line faults, since the control signals are provided by the signal which is broadcast by the FM transmitter. Economical use is made of the telephone lines since they are only used in portions of the communication system where radio facilities would be impractical or uneconomical. Also, since conventional FM broadcast transmitters operate at relative high powers, sufficient coverage is readily obtainable. The fact that FM stations used with the arrangement of this invention would normally be already in use for braodcasting purposes, large capital outlays for the radio facilities to implement this communication system would not be required.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
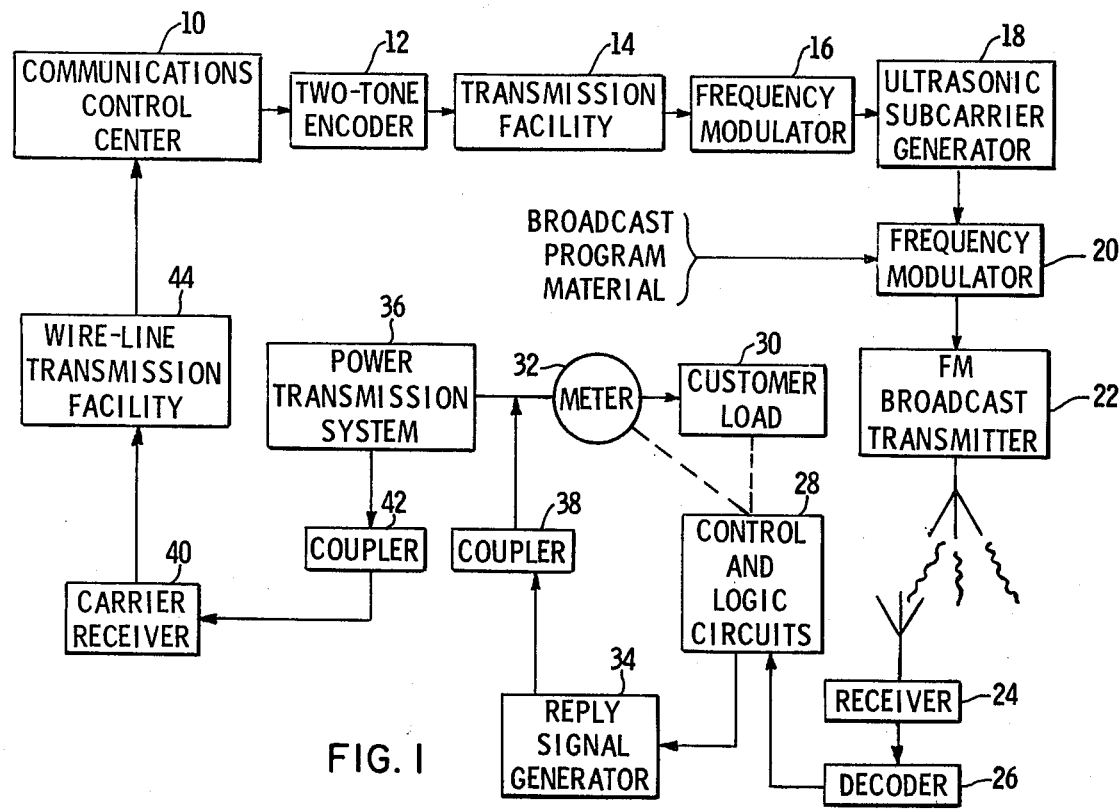
FIG. 1 is a block diagram of a power system communication system constructed according to a specific embodiment of this invention.

Throughout the following description, similar reference characters refer to similar elments or members in all of the figures of the drawing.

Referring now to the drawing, and to FIG. 1 in particular, there is shown a block diagram of a communication system constructed according to a specific embodiment of this invention. The communications control center 10 represents the location at which the communication signals are originated and at which any reply signals are terminated. Typically, the communications control center 10 would be located at a convenient point centrally located with respect to the customers on the power system. Alternately, the communications control center 10 may be located at the generating station or at a substation along the power system.

The intelligence originating at the communications control center 10 is transferred to a two-tone decoder 12 which suitably processes the intelligence information and provides a two-tone output signal corresponding thereto. Other arrangements may be used, however experience has shown that higher reliability may be obtained with two-tone frequency-shift-keyed signal systems when the information rate is not too high to make this type of signal impractical. The two-tone signal is applied to a suitable transmission facility 14 which conveys the two-tone signal to an FM broadcast station. The transmission facility 14 may include any of the conventional transmission components, such as a radio microwave link or a telephone line. The intelligence information usually comsists of signals which control the application of loads at the customer location or interrogate the customer's metering facility to determine the energy consumed.

The two-tone signal is applied to a frequency modulator 16 at the FM broadcast station. The frequency modulator 16 is coupled to an ultrasonic subcarrier generator 18 to provide a frequency modulated ultrasonic signal suitable for modulating the main frequency modulator 20 of the FM broadcast transmitter 22. The frequency of the ultrasonic subcarrier typically would have a value of 20 kHz or greater. In addition to the frequency modulated ultrasonic subcarrier signal, the regular broadcast program material is applied to the frequency modulator 20. The composite signal, which will be described in more detail in connection with FIG. 3, modulates the transmitter 22. The signal radiated by the transmitter 22 is received by all of the receivers located within the coverage area of the transmitter 22.

The receiver 24 represents a receiver within the coverage area of the transmitter 22 and, in this embodiment, represents the particular receiver to which the communication signal described herein has been directed. It is emphasized that, with a particular communication signal, more than one receiver or group of receivers may be addressed by the communications control center 10. For example, the two-tone signal may contain information which would reduce the electrical load drawn from all of the customer locations associated with a particular portion of the distribution system.

The FM signal received by the receiver 24 is applied to a decoder 26 which filters the two-tone signal from the regular broadcast program material. The decoder 26 also demodulates the received signal and applies the two-tone signal to the control and logic circuits which would normally be located at the customer location. Depending upon the action required by the signal, the control and logic circuit 28 would perform the proper function associated with the customer's load 30 and/or the power meter 32. For example, if the signal instructed the control and logic circuit to disconnect a portion on the customer's load, the customer load 30 would be affected thereby. Another instruction from the control center may be to interrogate the watt-hour meter 32 to determine how much energy the customer has used over a certain period of time. Either instruction may require a response from the customer location to the control center 10. Such a response may be an indication that the load has been removed, or an indication of the amount of energy consumed as measured by the meter 32. It is evident that, in certain applications, response or reply signals would not always be necessary. Thus, a substantial amount of control over the customer location can be obtained by use of the FM broadcast transmitter 22 without dependence upon wire line facilities, either of the power transmission type or of the telephone type.

Assuming a reply is appropriate, the control and logic circuit 28 activates the reply signal generator 34 which is connected to the power transmission system 36 by the coupler 38. Normally, the coupling of the reply signal to the power transmission system would be accomplished near the customer location. Conventional transmission or distribution line carrier systems may be used to convey the reply signal along the power transmission system 36.

At a remote location from the customer load location, the receiver 40 is connected to the power transmission system by the coupler 42. The response signal is then processed by the receiver 40 and applied to a suitable wire line transmission facility 44, such as a telephone line, which is directed to the communications control center 10. Thus, a complete two-way communication system is established between the communications control center 10 and the control and logic circuits 28 positioned at the customer load location.

Figure 2:
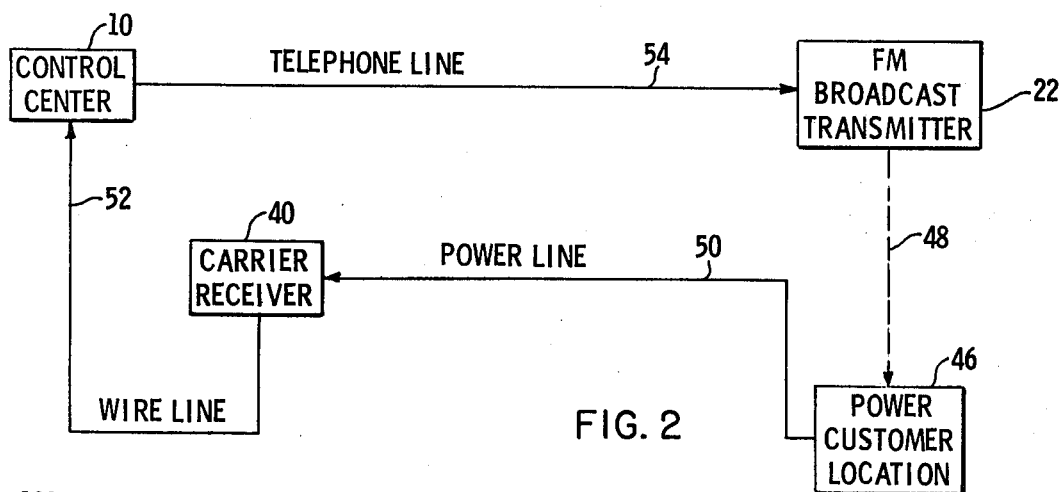
FIG. 2 is a simplified representation of the diagram shown in FIG. 1.

FIG. 2 is a simplified diagram of the power line communication system shown in FIG. 1. FIG. 2 clearly illustrates the three primary modes of transmission used to complete the two-way communication facility. The three primary modes include the radio path 48 between the broadcast transmitter 22 and a receiver located at the power customer location 46, the power line carrier communication system 50, and a wire line link 52 between the carrier receiver 40 and the control center 10. The telephone line 54 between the control center 10 and the FM broadcast transmitter 22 does not necessarily need to be a telephone line to provide the advantages of the invention claimed herein. However, since the telephone line 54 would not usually be carried by the same supporting structures as the power line system serving the power customer location 46, common failure of the telephone line 54 and the power distribution system would be unlikely. Therefore, the advantages of using radio facilities would still exist.

The system illustrated in FIG. 2 provides several advantages over any previously disclosed power line communication systems. FM broadcast transmitters are usually available in most areas of the United States which have a coverage area containing all of the customer load locations of power distribution systems. Therefore, the expense of dedicated radio facilities used primarily for signaling, interrogating and controlling power customer locations would not be required. In addition, the relatively high power of FM broadcast stations provides for substantially reliable communications to the customer load locations, especially when the two-tone signal method briefly disclosed herein is used. Another advantage of using standard commercial FM broadcasting equipment is in the fact that conventional FM receiver technology may be used to provide the receiving apparatus at each customer location. Due to the sophistication of this technology and to the high production capabilities which presently exist, a suitable receiver would be relatively inexpensive compared to typical receiving apparatus used with conventional two-way radio systems.

The feasibility of using a commercial FM broadcast transmitter to transmit the communication signals to the customer load locations depends upon a suitable method for modulating the FM transmitter with the communication signal to provide an output which is compatible with presently used broadcasting techniques. In addition, any system used should not interfere with the reception of the standard broadcast program material simultaneously transmitted along with the power line communication signals.

Figure 3:
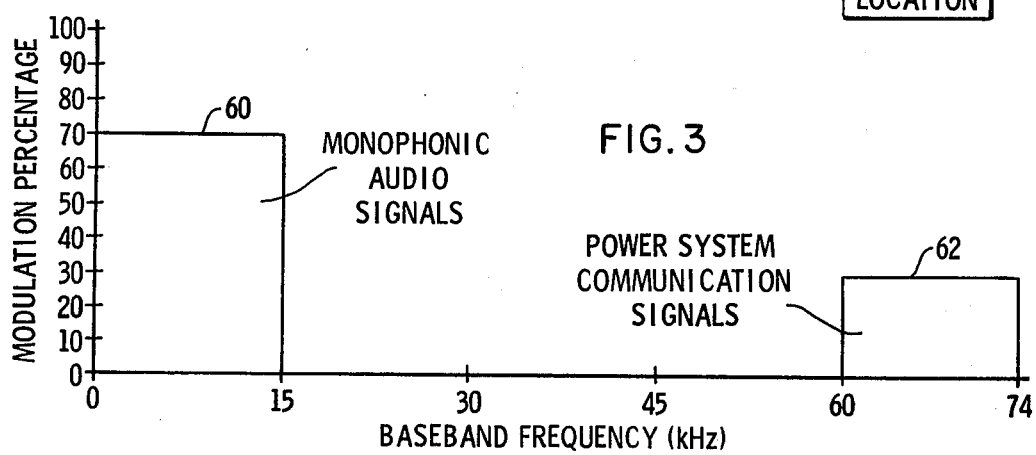
FIG. 3 is a graph illustrating a typical frequency spectrum distribution for the baseband modulation of the FM broadcast transmitter shown in FIG. 1.

FIG. 3 is a graph illustrating the baseband or modulating frequency of the FM broadcast system which may be used to provide the compatibility between the standard broadcast programming signals and the power system communication signals. The specific embodiment illustrated in FIG. 3 and to be described herein is compatible with the Subsidiary Communications Authorizations (SCA) authorized by the Federal Communications Commission for FM broadcast stations. The baseband frequencies represented by FIG. 3 indicate the frequency spectrum which exists at the FM receiver after the transmitted FM signal has been demodulated.

Assuming that the FM transmitter is broadcasting conventional monophonic audio signals having a maximum frequency of 15 kHz, the standard broadcast program material would be contained within the spectrum segment 60 which is located below 15 kHz. The arithmetic sum of the modulation provided by the monophonic audio signals must not exceed 70% of the total carrier modulation to prevent the modulation provided by the power system communication signals from overmodulating the transmitter. The power system communication signals occupy the spectrum, in this specific embodiment, between 60 and 74 kHz. Its modulation percentage is limited to 30% of the carrier modulation to prevent any cross-modulation between the standard broadcast program material and the power system communication signals. Although the segment 62 is shown to consist of a bandwidth of 14 kHz, the bandwidth is dependent upon the frequency of the tones being transmitted and the rate at which they are being changed. In general, the frequency segment 62 would be contained within the region between 20 and 75 kHz of the baseband frequency regardless of the bandwidth of the segment 62. By placing the communication signals in an ultrasonic range above the normal program material, the signals can be transmitted simultaneously without interference and separated at the receiver by a relatively simple filter.

When the FM broadcast transmitter is transmitting stereophonic programming material, the audio signals having a bandwidth of 15 kHz are reduced in modulation percentage to prevent overmodulation of the transmitter. Additional segments of the baseband frequency are included to convey the information needed for proper stereophonic broadcasting. With such a type of broadcasting, the segment 62 would normally be confined somewhere within the region between 53 and 75 kHz of the baseband frequency. In addition, since the stereophonic information can modulate the transmitter up to 90%, the modulation by the communication signals is limited to 10%.

The baseband frequency spectrum shown in FIG. 3 is produced by demodulation at the receiver and is applied to a suitable filter which filters out the normal broadcast program material and allows passage of only the segment 62 which contains the power system communication signals. These signals are detected to provide the two-tone signals which were originally generated at the control center.

By using the arrangements disclosed herein, a reliable, economic and bidirectional communication system can be established between a control center and various power customer locations. Since numerous changes may be made in the above-described system, and since diffferent embodiments of the invention may be made without departing from the spirit thereof, it is intended that all of the matter contained in the foregoing description, or shown in the accompanying drawing, shall be interrupted as illustrative rather than limiting.

I claim as my invention:

1. A bidirectional communication system for electrical power systems, comprising:
   a communications control terminal capable of generating a first communication signal;
   means for generating electromagnetic radiation;
   means for transferring the first communication signal from the control terminal to the means for generating electromagnetic radiation;
   means responsive to the communication signal for modulating the electromagnetic radiation;
   means located at a power customer location for receiving the modulated electromagnetic radiation;
   means located at the customer location for demodulating and processing the received electromagnetic radiation and generating a second communication signal;
   means for applying the second communication signal to a power line carrier signal transmitter;
   means for connecting the signal transmitter to the power line at the customer location; and means for remotely receiving the second communication signal from the power system and applying it to a wire line;

said wire line transferring the second communication signal to the communications control terminal.

2. The communication system of claim 1 wherein the means for generating electromagnetic radiation comprises a frequency modulated broadcast transmitter operating between the frequencies of 88 and 108 megahertz.

3. The communication system of claim 2 wherein the broadcast transmitter is frequency modulated by a baseband signal which contains at least first and second frequency spectrum segments, said first spectrum segment containing audio frequency signals responsive to the standard program material being broadcast by the transmitter, and said second spectrum segment containing ultrasonic signals responsive to the communication signals from the control terminal.

4. The communication system of claim 3 wherein the first spectrum segment contains frequencies normally below 15 kHz and the second spectrum segment contains frequencies only between 20 kHz and 75 kHz.

5. The communication system of claim 4 wherein the arithmetic sum of the modulation of the broadcast transmitter by the ultrasonic signals is not over 30% of the maximum acceptable modulation of the broadcast transmitter carrier.

6. The communication system of claim 3 wherein the baseband signal also contains a third spectrum segment containing ultrasonic signals having instantaneous frequencies between 23 kHz and 53 kHz, and wherein the second spectrum segment contains frequencies between 53 and 75 kHz.

7. The communication system of claim 6 wherein the arithmetic sum of the modulation of the broadcast transmitter by the ultrasonic signals is not over 10% of the maximum acceptable modulation of the broadcast transmitter carrier.

8. A bidirectional communication system for electrical power systems, comprising:

a communications control center capable of generating frequency-shift-keyed two-tone communication signals;

a frequency modulated transmitter having a carrier frequency between 88 and 108 megahertz;

means for transferring the the two-tone communication signals from the control center to said transmitter;

means for frequency modulating a subcarrier with the two-tone communication signals, said subcarrier having a frequency between 20 kHz and 75 kHz;

means for frequency modulating said transmitter with the modulated subcarrier and with audio frequency signals corresponding to the standard program material to be transmitted by said transmitter;

means located at a power customer location for receiving and demodulating the transmitted signals, said means including a filter which separates said modulated subcarrier signal from the program material signal;

means located at the power customer location for generating a reply signal;

means for applying the reply signal to a power line carrier communication transmitter;

means for coupling the power line carrier communications transmitter to the power line at the customer location;

means for receiving signals from the power line carrier communication transmitter at a location remote from the customer location; and a wire line facility which carries the reply signal from the carrier communication receiver to the communications control center.

* * * * *